United States Patent
Arwashan

(10) Patent No.: US 12,479,394 B2
(45) Date of Patent: Nov. 25, 2025

(54) ONE-PIECE FOLD-FLAT AIRBAG DESIGN

(71) Applicant: ZF Passive Safety Systems US Inc., Washington, MI (US)

(72) Inventor: Naji Arwashan, Troy, MI (US)

(73) Assignee: ZF PASSIVE SAFETY SYSTEMS, US INC., Washington, MI (US)

( * ) Notice: Subject to any disclaimer, the term of this patent is extended or adjusted under 35 U.S.C. 154(b) by 0 days.

(21) Appl. No.: 18/605,039

(22) Filed: Mar. 14, 2024

(65) Prior Publication Data

US 2025/0289389 A1    Sep. 18, 2025

(51) Int. Cl.
  *B60R 21/231*  (2011.01)
  *B60R 21/235*  (2006.01)
  *B60R 21/237*  (2006.01)

(52) U.S. Cl.
  CPC .......... *B60R 21/231* (2013.01); *B60R 21/235* (2013.01); *B60R 21/237* (2013.01); *B60R 2021/23576* (2013.01)

(58) Field of Classification Search
  CPC ... B60R 21/203; B60R 21/205; B60R 21/231; B60R 21/235; B60R 21/237; B60R 2021/23571; B60R 2021/23576
  See application file for complete search history.

(56) References Cited

U.S. PATENT DOCUMENTS

| | | | | |
|---|---|---|---|---|
| 5,316,337 A * | 5/1994 | Yamaji | .................. | B60R 21/231 280/743.1 |
| 5,529,340 A * | 6/1996 | Fairbanks | ............. | B60R 21/231 280/743.1 |
| 5,533,755 A * | 7/1996 | Nelsen | .................. | B60R 21/231 428/36.1 |
| 5,865,467 A * | 2/1999 | Bito | ...................... | B60R 21/231 280/743.1 |
| 5,975,571 A * | 11/1999 | Ford | ..................... | B60R 21/231 280/743.1 |
| 7,922,198 B2 * | 4/2011 | Urushibata | ........... | B60R 21/235 280/743.1 |
| 8,955,879 B2 * | 2/2015 | Aranzulla | ............. | B60R 21/231 280/743.1 |
| 10,899,309 B2 * | 1/2021 | Hotta | ..................... | B60R 21/233 |
| 11,097,683 B2 * | 8/2021 | Ishii | ..................... | B60R 21/2338 |
| 11,254,281 B2 * | 2/2022 | Hayakawa | ............ | B60R 21/231 |

* cited by examiner

*Primary Examiner* — Laura Freedman
(74) *Attorney, Agent, or Firm* — Tarolli, Sundheim, Covell & Tummino LLP

(57) ABSTRACT

An apparatus for helping to protect an occupant of a vehicle includes an airbag configured to be mounted on a vehicle structure and to be inflatable between the vehicle structure and the vehicle occupant. The airbag includes a single sheet of airbag material configured to have a plurality of leaves that extend radially from a point on the panel, wherein each leaf comprises a tip and edges that extend on opposite sides of the tip from the tip to a root where adjacent leaves meet each other. Connections interconnect adjacent edges of adjacent leaves on opposite sides of the root between the adjacent leaves. The connections extend from the root to the tip to form a closed inflatable volume from the single sheet of airbag material.

22 Claims, 10 Drawing Sheets

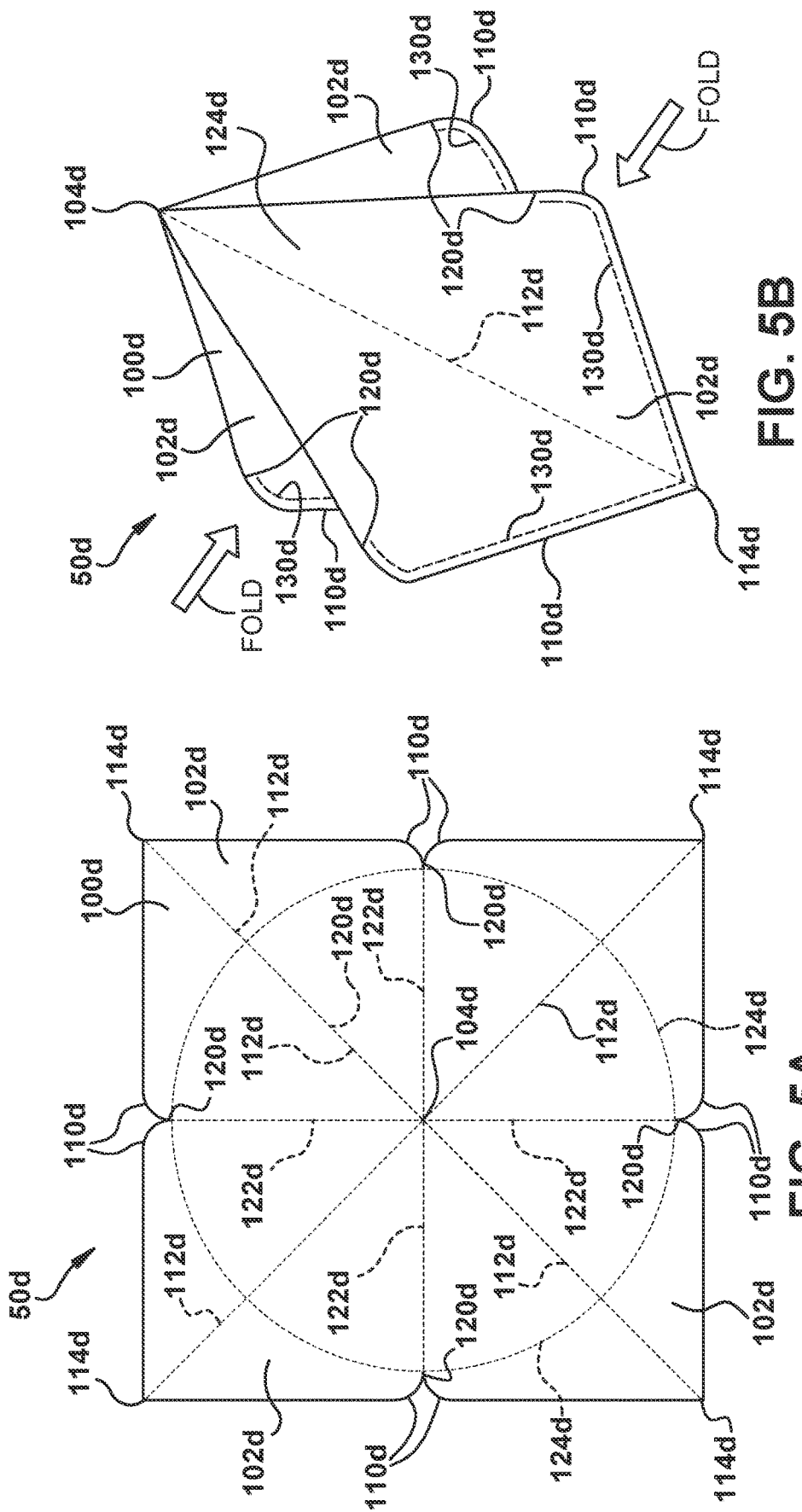

ONE-PIECE FOLD-FLAT AIRBAG DESIGN

TECHNICAL FIELD

This disclosure relates to an apparatus for helping to protect an occupant of a vehicle. More particularly, this disclosure relates to an airbag that is formed from a single panel of material having portions that are stitched together to define the airbag. The stitched together airbag is configured to be folded flat without requiring excessive pleating.

BACKGROUND

It is known to provide an inflatable vehicle occupant protection device, such as an airbag, for helping to protect an occupant of a vehicle. One particular type of airbag is a frontal airbag configured to deploy in front of a seated occupant to an inflated condition in which the airbag is positioned between the occupant and vehicle structure that supports the airbag. Depending on the configuration of the vehicle and the seat position with which the airbag is associated, the airbag can help protect the occupant from impacts with parts of the vehicle such as a steering wheel, an instrument panel, or a seat of an adjacent row of vehicle seating.

For example, for front-row seating, driver frontal airbags inflate between the steering wheel and the occupant of a driver seat of the vehicle, and passenger frontal airbags inflate between the instrument panel and the occupant of a passenger side seat of the vehicle. In second row, third row, etc. seats, frontal airbags inflate between the occupant and the seat of the forward adjacent seating row.

Front row passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated position. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated position. The airbag cover opens as a result of forces exerted on the cover by the inflating driver airbag.

Second row, third row, etc. airbags are typically stored in a deflated condition in a cover/housing that is mounted to the seat (e.g., seatback) of the forward adjacent seating row. The cover/housing, as well as the upholstery of the seat upon which the airbag is mounted, help enclose and conceal the airbag in a stored condition. The inflating airbag exerts deployment forces on the housing/cover/upholstery, resulting in an opening and/or tearing that permits the airbag to deploy to an inflated position.

Inflatable vehicle occupant protection devices also include airbags for providing side protection, such as side airbags mounted in a seat or side door, and curtain airbags mounted in or along the vehicle roof. Inflatable knee bolster airbags can inflate in a footwell of the vehicle to help protect the occupant's knees and lower legs.

Depending on their intended installation and function, airbags need to have an overall shape configured to conform to adjacent vehicle structures and fill a required volume of space. Because of this, airbag constructions can become complex, requiring multiple panels that are stitched together to define the airbag. This can complicate the manufacturing process by requiring intricate placement and folding of panels and complicated stitch patterns.

SUMMARY

An airbag is constructed of a single panel of material with portion that are stitched together or otherwise interconnected to define an enclosed inflatable volume. The single panel airbag is configured to fold flat for packaging and implementation in an airbag module.

According to one aspect, an apparatus for helping to protect an occupant of a vehicle includes an airbag configured to be mounted on a vehicle structure and to be inflatable between the vehicle structure and the vehicle occupant. The airbag includes a single sheet of airbag material configured to have a plurality of leaves that extend radially from a point on the panel, wherein each leaf comprises a tip and edges that extend on opposite sides of the tip from the tip to a root where adjacent leaves meet each other. Connections interconnect adjacent edges of adjacent leaves on opposite sides of the root between the adjacent leaves. The connections extend from the root to the tip to form a closed inflatable volume from the single sheet of airbag material.

According to another aspect, the leaves can extend orthogonally from the point on the panel.

According to another aspect, the point can be a center point on the panel.

According to another aspect, each edge of each leaf can have a length configured to control a depth of the airbag when inflated.

According to another aspect, the airbag when deflated can be configured to fold flat for storage prior to inflation.

According to another aspect, the airbag can be configured for an opposing pair of leaves to be folded inward along respective centerlines that extend from their tips to a center point on the panel such that portions on opposite sides of the centerline of each leaf lie flat on top of each other.

According to another aspect, a remaining pair of leaves can be configured to lie flat against opposite sides of the folded inward opposing pair of leaves.

According to another aspect, the leaves can have edges that vary in length. The lengths of the edges can be configured to control the inflated depth of the airbag.

According to another aspect, the adjacent edges of the adjacent leaves are configured so that their lengths are equal.

According to another aspect, the connections can include stitching that interconnect the adjacent edges.

According to another aspect, the adjacent edges of adjacent leaves on opposite sides of the root between the adjacent leaves can be equal in length.

According to another aspect, the adjacent edges of adjacent leaves on opposite sides of the root between the adjacent leaves can be identical.

According to another aspect, the airbag comprises can be a steering wheel mounted driver airbag, an instrument panel mounted passenger airbag, a side airbag, a center airbag, or a knee airbag.

According to another aspect, the airbag can be a component of an airbag module. The airbag module can also include an inflator for inflating the airbag and a housing for supporting the inflator and the airbag in a deflated and stored condition.

According to another aspect, the airbag module can be a component of a vehicle safety system. The vehicle safety system can also include at least one crash sensor and a controller configured to control the actuation of the inflator in response to the at least one crash sensor.

DRAWINGS

The foregoing and other features of the present invention will become apparent to one skilled in the art to which the subject disclosure relates upon consideration of the following description with reference to the accompanying drawings, in which:

FIGS. 5A-5D illustrate a first example configuration of an airbag that can be implemented in the vehicle safety system of FIG. 1.

DESCRIPTION

Figure 1A:
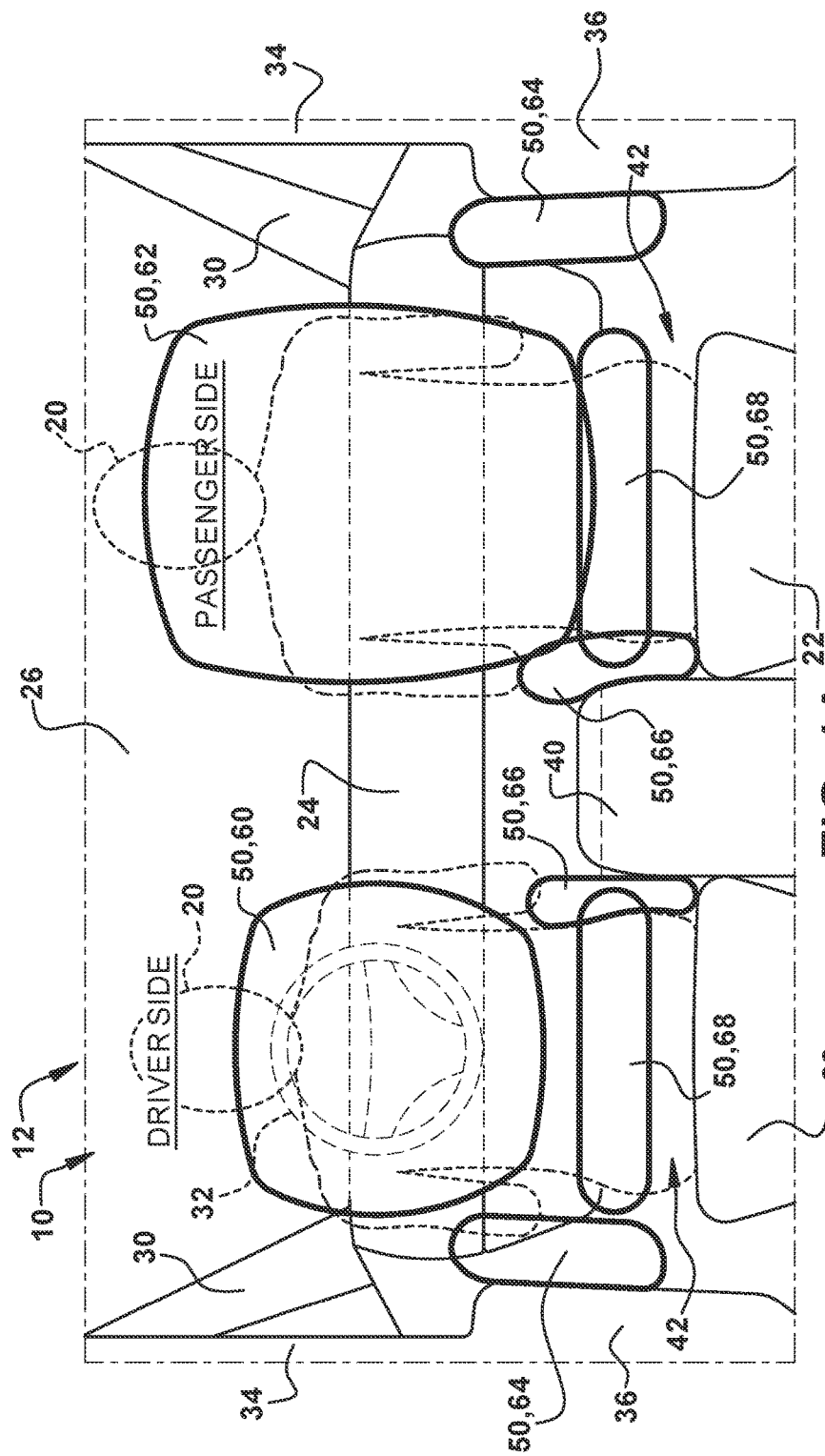
FIG. 1A is a schematic view illustrating a vehicle safety system including multiple different airbag implementations for helping to protect an occupant of a vehicle.

FIG. 1A illustrates an example configuration of a vehicle safety system 10 for helping to protect an occupant 20 of a vehicle 12. The view of FIG. 1A is from the perspective of viewing the occupants 20 of front row vehicle seats 22: one on a driver side and one on a passenger side of the vehicle 12. Each seat 22 supports one of the occupants 20.

Being a front row of the vehicle 12, the occupants 20 are positioned on the seats 22 and are facing forward toward an instrument panel 24 of the vehicle 12. A vehicle windshield 26 extends upward from the instrument panel 24 between driver side and passenger side A-pillars 30. The occupant 20 on the driver side of the vehicle 12 faces a steering wheel 32.

The seats 22 are positioned adjacent respective side structures 34 on the driver side and passenger side of the vehicle 12. More specifically, each seat 22 is positioned adjacent a side door 36 that forms a part of the side structure 34. A center console 40 is positioned between the vehicle seats 22.

The vehicle safety system 10 includes an apparatus in the form of airbag 50. In FIG. 1A, several different configurations of airbags 50 that can be implemented in the vehicle safety system 10 are shown. The vehicle safety system 10 need not include all of the different airbags 50 shown in FIG. 1A. The vehicle safety system 10 can include one or more of the airbags 50 shown in FIG. 1A, in any combination.

Figure 1B:
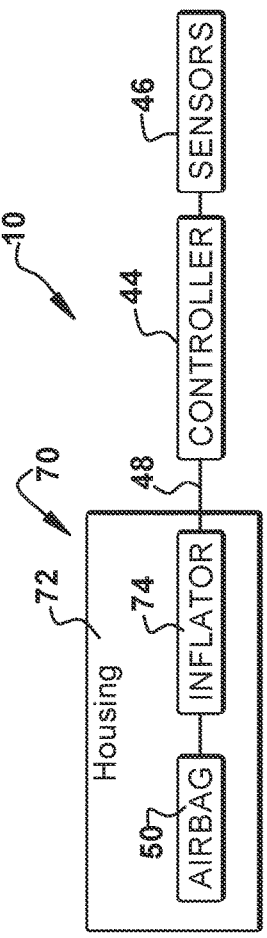
FIG. 1B is a schematic view illustrating an airbag module, controller, and sensors that form a portion of the vehicle safety system.

Each airbag 50 of the vehicle safety system 10 can be implemented in an airbag module. An example configuration of an airbag module 70 is shown schematically in FIG. 1B. As shown in FIG. 1B, the airbag module 70 includes a housing 72 that supports the airbag 50 and an inflator 74 configured to provide inflation fluid for inflating the airbag. Prior to deployment, the airbag 50 is deflated and rolled/folded to a stored condition in which the airbag is placed in the housing 72.

Referring to FIG. 1A, one of the airbags 50 is a driver frontal airbag 60 configured to inflate between the steering wheel 32 and the occupant 20 of the driver side seat 22. The driver frontal airbag 60 forms a part of a driver frontal airbag module that is mounted on the steering wheel 32. The driver frontal airbag module includes a housing (see FIG. 1B) configured to be mounted to the steering wheel 32 and an inflator (see FIG. 1B) mounted in the housing along with the driver frontal airbag 60. The driver frontal airbag 60 is inflatable from a deflated and stored condition in the housing to the inflated and deployed condition, shown in FIG. 1A, between the steering wheel 32 and the occupant 20 of the driver side seat 22.

Another one of the airbags 50 is a passenger frontal airbag 62 configured to inflate between the instrument panel 24 and the occupant 20 of the passenger side seat 22. The passenger frontal airbag 62 forms a part of a passenger frontal airbag module that is mounted on the instrument panel 24. The passenger frontal airbag module includes a housing (see FIG. 1B) configured to be mounted to the instrument panel 24 and an inflator (see FIG. 1B) mounted in the housing along with the passenger frontal airbag 62. The passenger frontal airbag 60 is inflatable from a deflated and stored condition in the housing to the inflated and deployed condition, shown in FIG. 1A, between the instrument panel 24 and the occupant 20 of the passenger side seat 22.

The airbags 50 also include side airbags 64 configured to inflate between the side doors 36 and the occupant 20 of the vehicle seat 22 positioned adjacent to the side door. The driver side airbag 64 forms a part of a driver side airbag module that is mounted on the driver side door 36. The passenger side airbag 64 forms a part of a passenger side airbag module that is mounted on the passenger side door 36. Each side airbag module includes a housing (see FIG. 1B) configured to be mounted to the side door 36 and an inflator (see FIG. 1B) mounted in the housing along with the side airbag 64. The driver side airbag 64 is inflatable between the side door 36 and the occupant 20 on the driver side of the vehicle 12. The passenger side airbag 64 is inflatable between the side door 36 and the occupant 20 on the passenger side of the vehicle 12.

The airbags 50 also include center airbags 66 configured to inflate between the center console 40 and the occupants 20 of the vehicle seats 22. The driver center airbag 66 forms a part of a driver center airbag module that is mounted on the center console 40 adjacent the driver side seat 22. The passenger center airbag 66 forms a part of a passenger center airbag module that is mounted on the center console 40 adjacent the passenger side seat 22. Each center airbag module includes a housing (see FIG. 1B) configured to be mounted to the center console 40 and an inflator (see FIG. 1B) mounted in the housing along with the center airbag 66. The driver center airbag 66 is inflatable between the center console 40 and the occupant 20 on the driver side of the vehicle 12. The passenger center airbag 66 is inflatable between the center console 40 and occupant 20 on the passenger side of the vehicle 12.

The airbags 50 also include knee airbags 68 configured to inflate at least partially in footwells 42 on the driver and passenger sides of the vehicle 12. The driver knee airbag 68 forms a part of a driver knee airbag module that is mounted on instrument panel 24 on the driver side of the vehicle 12. The passenger knee airbag 68 forms a part of a passenger knee airbag module that is mounted on instrument panel 24 on the passenger side of the vehicle 12. Each knee airbag module includes a housing (see FIG. 1B) configured to be mounted to the instrument panel 24 and an inflator (see FIG.

1B) mounted in the housing along with the knee airbag 68. A driver knee airbag 68 is inflatable at least partially in the footwell 42 and, when inflated, is positioned between lower portions of the instrument panel 24 and the occupant 20 of the seat 22 on the driver side of the vehicle 12. A passenger knee airbag 68 is inflatable at least partially in the footwell 42 and, when inflated, is positioned between lower portions of the instrument panel 24 and the occupant 20 of the seat 22 on the passenger side of the vehicle 12.

The vehicle safety system 10 can also include other airbags, such as roof rail airbags, rear seat frontal airbags, rear seat side airbags, and rear seat center airbags. Each of these airbags would form a part of a respective airbag module (see FIG. 1B), which would include a housing for storing the airbag in the deflated and stored condition, and an inflator configured to inflate the airbag from the housing to the inflated and deployed condition.

Referring to FIG. 1B, the inflators 74 included in the respective airbag modules are actuatable to provide inflation fluid to an inflatable volume of the respective airbags 50 to deploy the airbags to the inflated condition. The inflators 74 can be of any known type, such as stored gas, solid propellant, augmented or hybrid. The vehicle safety system 10 also includes a controller, illustrated schematically at 44, for providing an actuation signal to the apparatus in signals from sensors 46 responsive to a crash event. The sensors 46 can include crash sensors, such as accelerometers for sensing vehicle crash conditions. The sensors 46 can also include condition sensors for sensing vehicle and/or occupant conditions, such as seat weight sensors, seat position sensors, seatbelt buckle latch sensors, and occupant presence sensors. The inflators are is operatively connected to the controller 44 via lead wires 48.

The controller 44 can provide the actuation signal to the inflator in response to one or more of the sensors 46 detecting the occurrence of a vehicle crash event. At the same time, the controller 44 can tailor airbag deployment in response to vehicle and/or occupant conditions determined via the sensors 46. For example, if the condition sensors 46 determine a condition, such as a full-forward seat position, an unbuckled occupant, or the presence of a small occupant positioned close to the instrument panel 24 and/or airbag 50, the controller 44 can cause a vent to be placed in the opened condition when the airbag is deployed, or can activate a single stage of a two-stage or multi-stage inflator.

The airbags 50 can be constructed of any suitable material, such as nylon, e.g., woven nylon 6-6 yarns having portions interconnected by known means, such as stitching, ultrasonic welding, heat bonding, or adhesives, to form the airbags. The airbags 50 can be uncoated, coated with a material, such as a gas impermeable urethane, or laminated with a material, such as a gas impermeable film. The airbags 50 thus can have a gas-tight or substantially gas-tight construction. Those skilled in the art will appreciate that alternative materials, such as polyester yarn, and alternatives coatings, such as silicone, can also be used to construct the airbags 50.

Upon sensing the occurrence of an event for which inflation of one or more of the airbags 50 is desired, such as a vehicle collision, the sensors 46 provide a signal to the controller 44, which actuates the inflator via the lead wires 48. Upon receiving the signal from the controller 50, the inflator 74 is actuated and provides inflation fluid to the inflatable volume of the airbag(s) 50 in a known manner. The airbag(s) 50 inflate towards the occupant 20 from their respective stored conditions to the inflated and deployed conditions illustrated in FIG. 1A. The airbag(s) 50, while inflated, help protect the vehicle occupant 20 from impacts with parts of the vehicle 12, such as the instrument panel 24, side structure 34, side doors 36, and center console 40, and helps provide a desired ride-down effect.

Each of the airbags 50 described above can have a construction that is efficient in terms of both materials and manufacturing while, at the same time, performing well in terms of airbag coverage and performance. More specifically, each of the airbags 50 can be constructed of a single piece of material that is cut to a predetermined shape and has portions interconnected to define the inflatable volume of the airbag. Advantageously, the airbags 50 formed according to this construction can also be configured to fold flat, with minimal pleats of other accommodating folds, to facilitate their being placed in the stored condition and to promote a quick and efficient deployment.

First Example Configuration

A first example configuration of the airbag is shown in FIGS. 2A-2D. In these figures, reference numbers with the suffix "a" are used in order to avoid confusion with other example configurations of the airbags disclosed herein. According to this convention, similar or identical components of the example configurations of the airbags can use identical reference numbers, with the suffixes "a," "b," "c," etc. distinguishing between the configurations.

Figure 2B:
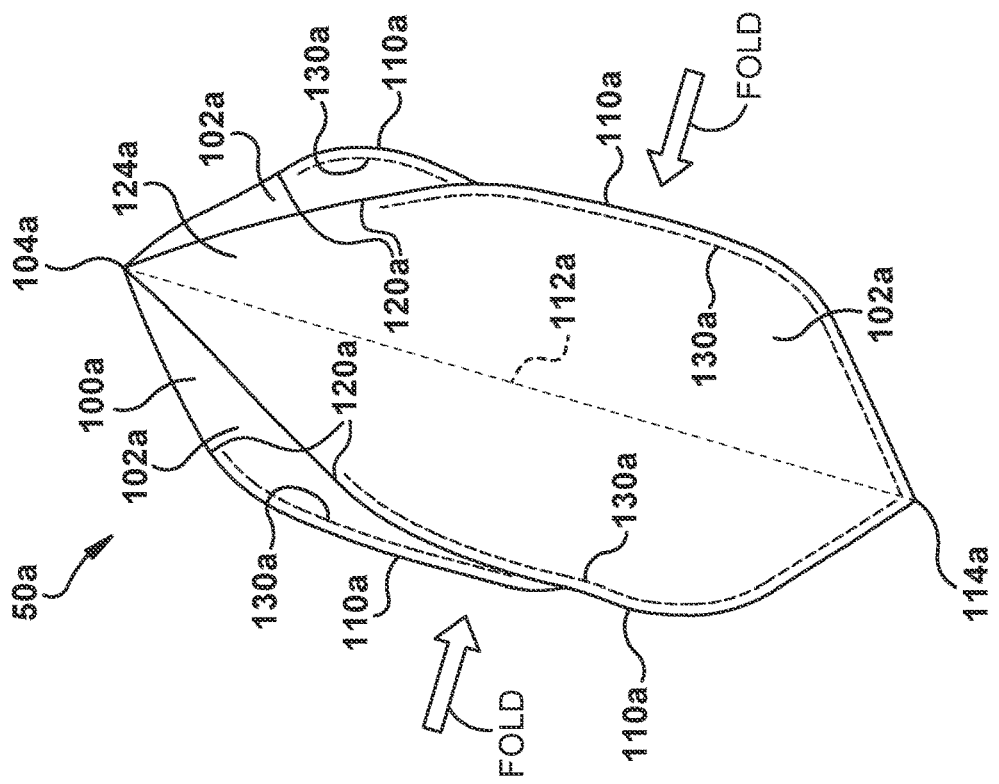
FIGS. 2A-2D illustrate a first example configuration of an airbag that can be implemented in the vehicle safety system of FIG. 1.
Figure 2A:
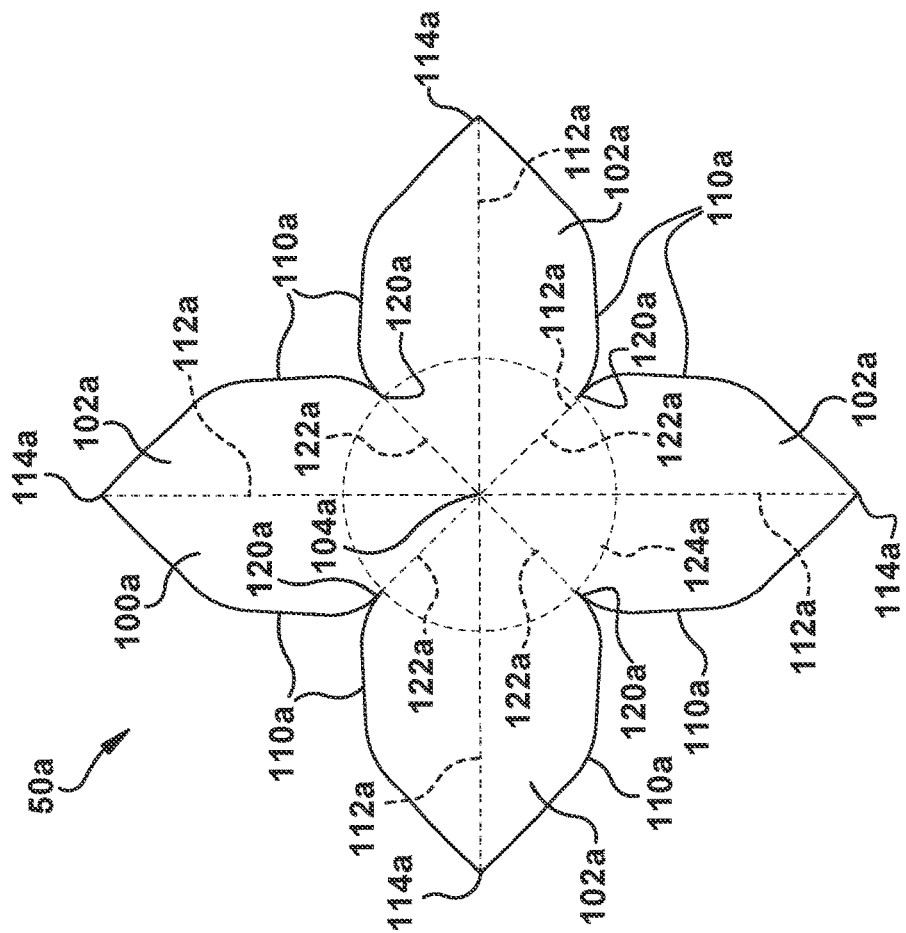

Referring to FIG. 2A, the airbag 50a includes a single panel 100a of airbag material (e.g., coated fabric) that is cut to a shape having four leaves 102a. As shown in the example configuration of FIGS. 2A-2D, the leaves 102a can have an identical configuration. The leaves 102a extend radially from a center point 104a on the panel 100a in orthogonal directions, with each leaf extending perpendicular to the adjacent leaves.

Each leaf 102a has opposite edges 110a that extend on opposite sides of a centerline 112a of the leaf. Like the leaves 102a, the centerlines 112a extend radially from the center point 104a of the panel 100a in orthogonal directions, with the centerline of each leaf extending perpendicular to the centerlines adjacent leaves. In the example configuration of FIG. 2A, the edges 110a are symmetrical with respect to the centerline 112a. The edges 110a do not, however, necessarily need to be symmetrical. It is, however, necessary for adjacent edges 110a to be equal or substantially equal in length, as will become apparent from the further descriptions set forth herein.

Each leaf 102a has a tip 114a located along its centerline 112a at the point furthest from the center point 104a of the panel 100a. The edges 110a of each leaf 102a meet at the tip 114a. Roots 120a of the leaves 102a are located at the ends of edges 110a opposite the tips 114a. The edges 110a of adjacent leaves 102a converge and meet each other at the roots 120a. Base lines 122a extend radially from the center point 104a to each root 120a. A base region 124a of the panel 100a is defined in the central area of the panel that extends radially outward from the center point 104a to the roots 120a. As shown in FIG. 2A, generally speaking, the base region 124a can be thought of as being bound by a circle with a center at the center point 104a having a radius equal to the lengths of the base lines 122a.

Referring to FIG. 2B, to construct the airbag 50a, the leaves 102a are manipulated, e.g., by bending or folding the panel 100a, so that adjacent edges 110a are positioned overlying each other. The overlying edges 110a are interconnected, e.g., by stitching, to form connections 130a that extend along the edges from the roots 120a to the tips 114a.

The formation of the connections 130a joins the adjacent leaves 102a and closes the panel 100a, thus defining an inflatable volume of the airbag 50a. The airbag 50a is thus formed simply through cutting or otherwise forming the leaves 102a in the panel 100a and then interconnecting the leaves along their adjacent edges 110a. No other panels or assembly steps are necessary.

Figure 6:
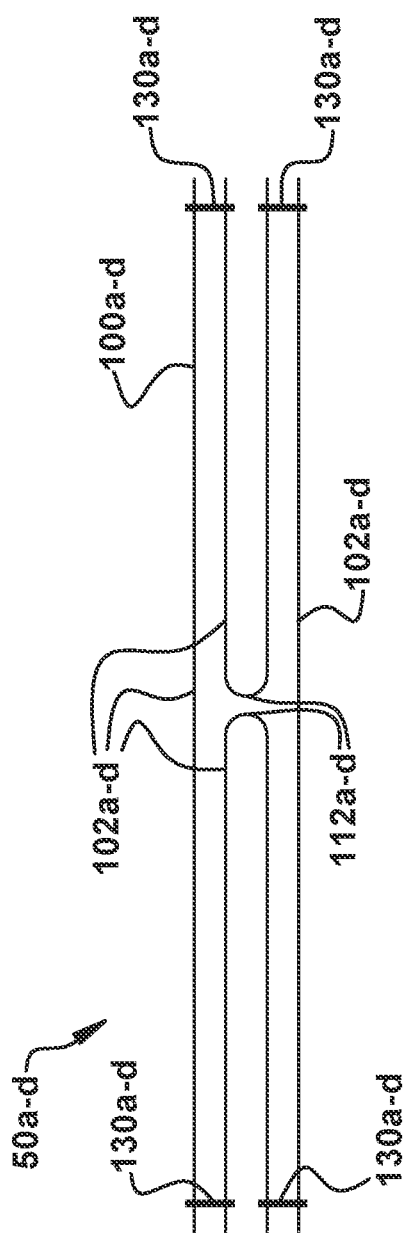
FIG. 6 is a schematic sectional view taken generally along line 6-6 in FIGS. 2C, 3C, 4C, and 5C.

Advantageously, the configuration of the airbag 50a allows it to be folded flat for packaging in the airbag module. As shown in FIG. 2B, two opposing leaves 102a of the airbag 50a (left and right leaves as viewed in FIG. 2B) are folded inward along their respective centerlines 112a, as indicated by the FOLD arrows in FIG. 2B. At the same time, the remaining leaves 102a (front and rear leaves as viewed in FIG. 2B) are pressed flat, as shown in FIG. 6. The resulting folded-flat airbag 50a is shown in FIG. 2C.

The ability to fold-flat the airbag 50a is owed to the airbag configuration in which the leaves 102a extend from the center point 104a along centerlines 112a that extend through their respective tips 114a. Because of this, when the opposing pair of leaves 102a are folded inward along their respective centerlines 112a, the resulting halves of the folded-in leaves can lie flat on top of each other. At the same time, the folding of the opposing pair of leaves 102a allows the remaining pair of leaves, which also oppose each other, to lie flat, with the folded-in leaves positioned in between. Once the airbag is placed in the folded flat condition of FIG. 2C, it can be further rolled/folded in any manner necessary to package the airbag 50a for installation. Advantageously, due to the aforementioned design, placing the airbag 50a in the flat-folded condition requires only two inward folds, and avoids excessive pleating and other folds that are typically required with more complicated designs.

Figure 2D:
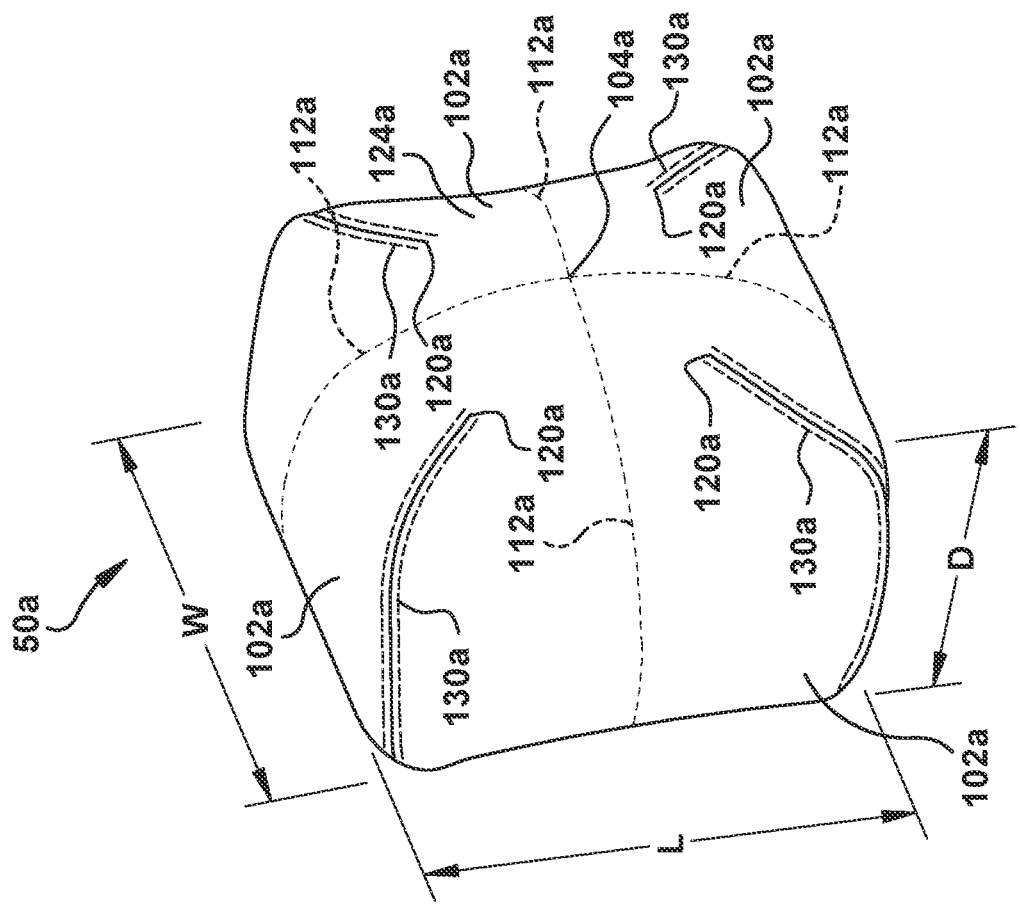
Figure 2C:
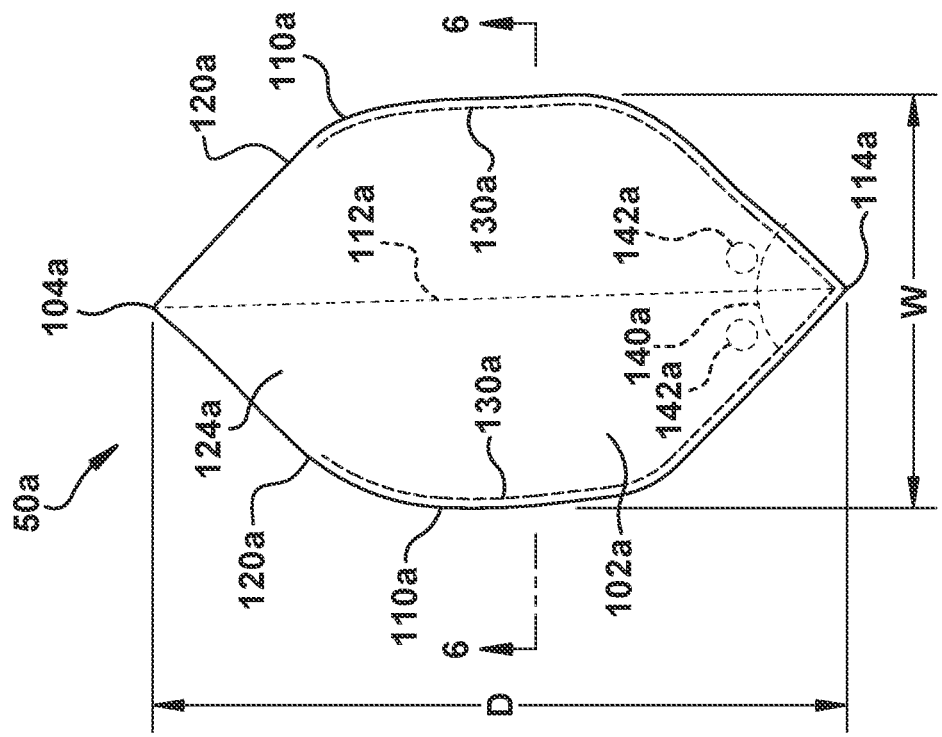

The airbag 50a is shown in its inflated state in FIG. 2D. As shown in this figure, the airbag 50a in expanding from the flat-folded condition, the airbag 50a contracts depthwise and expands lengthwise and widthwise, as indicated generally by the length L, width W, and depth D dimensions shown in FIGS. 3C-D. It will be appreciated that the resulting dimensions of the inflated airbag 50a are determined by the shape and dimensions of the panel 100a, specifically the leaves 102a. The inflated configuration of the airbag 50a can therefore be tailored by selecting/adjusting the dimensions of the leaves 102a, as will become evident from the additional example airbag configurations shown and described herein. As constructed, the airbag 50a of FIGS. 2A-D has a generally square configuration (see FIG. 2D) with the length L and width W dimensions being approximately equal and the depth D generally uniform or evenly distributes across its area.

In the assembled condition of the airbag 50a, the connections 130a meet each other at the location of the tips 114a of the leaves 102a. This end of the airbag 50a is therefore completely closed. Since the opposite end of the airbag 50a, i.e., the base 124a is also closed, it will be appreciated that the airbag represents a completely closed volume. Those skilled in the art will appreciate that the airbag 50a will necessarily be required to accommodate an inflator so that inflation fluid can be directed into the inflatable volume.

The portion of an airbag that interfaces with the inflator is referred to as an inlet or mouth portion of the airbag. The airbag 50a illustrated in FIGS. 2A-2D does not illustrate this feature, because its shape, size, and location can differ based on the implementation of the airbag and the portion(s) of the vehicle it is intended to cover. One example of a manner in which an inflator inlet can be implemented is shown in dashed lines in FIG. 2C.

Referring to FIG. 2C, the airbag 50a can include an inflator inlet 140a, which is illustrated in dashed lines in the figure. In this example configuration, the inlet 140a is formed at the end of the airbag 50a where the tips 114a of the leaves 102a meet. As shown, in FIG. 2C, the inlet 140a is formed as a circle, with each leaf 102a including a quarter-circle portion of the inlet. When the inlet 140a is implemented in this manner, the tips 114a of the leaves 102a where the connections 130a end are formed by the edges of the panel 100a that form the inlet. The inlet 140a could have alternative shapes, such as square, rectangular, or an irregular shape configured to accommodate the inflator. Still, the tips 114a of the leaves 102a would be formed by the edges of the panel 100a that form the inlet 140a. As shown in FIG. 2C, the airbag 50a can also include openings 142a for receiving fasteners, such as screws, bolts, pins, etc.

In the example configuration of FIGS. 2A-D, the inlet 140a is formed at the end opposite the base region 124a of the panel 100a. The base region 124a thus forms the occupant receiving surface of the airbag in the inflated condition (see FIG. 2D). Advantageously, the occupant receiving surface, formed by the base region 124a, is free from the stitching 130a that interconnects the leaves 102a. Thus, a large portion of the occupant receiving surface of the airbag 50a can be free from seams.

The inlet 140a and the openings 142a can be formed after the airbag 50a is stitched together by cutting the fabric along the lines shown in FIG. 2C. Alternatively, the inlet 140a and openings 142a can be cut in the panel 100a at the same time the remainder of the panel, including the leaves 102a, are formed. In this instance, the inlet 140a would become formed when the adjacent leaves 102a are stitched together.

The inlet 140a and openings 142a can be formed in other regions of the airbag 50a, either before or after the leaves 102a are stitched together. In this instance, the inlet 140a and/or openings 142a can be formed in a single leaf 102a or multiple leaves, depending on the desired location on the airbag 50a.

Second Example Configuration

A second example configuration of the airbag is shown in FIGS. 3A-3D. In FIGS. 3A-3D, reference numbers identical to those in FIGS. 2A-2D are used to identify portions or components of the second example configuration that are similar or identical to those of the first example configuration. In these figures, reference numbers with the suffix "b" is used in order to avoid confusion with other example configurations of the airbags disclosed herein.

Figure 3B:
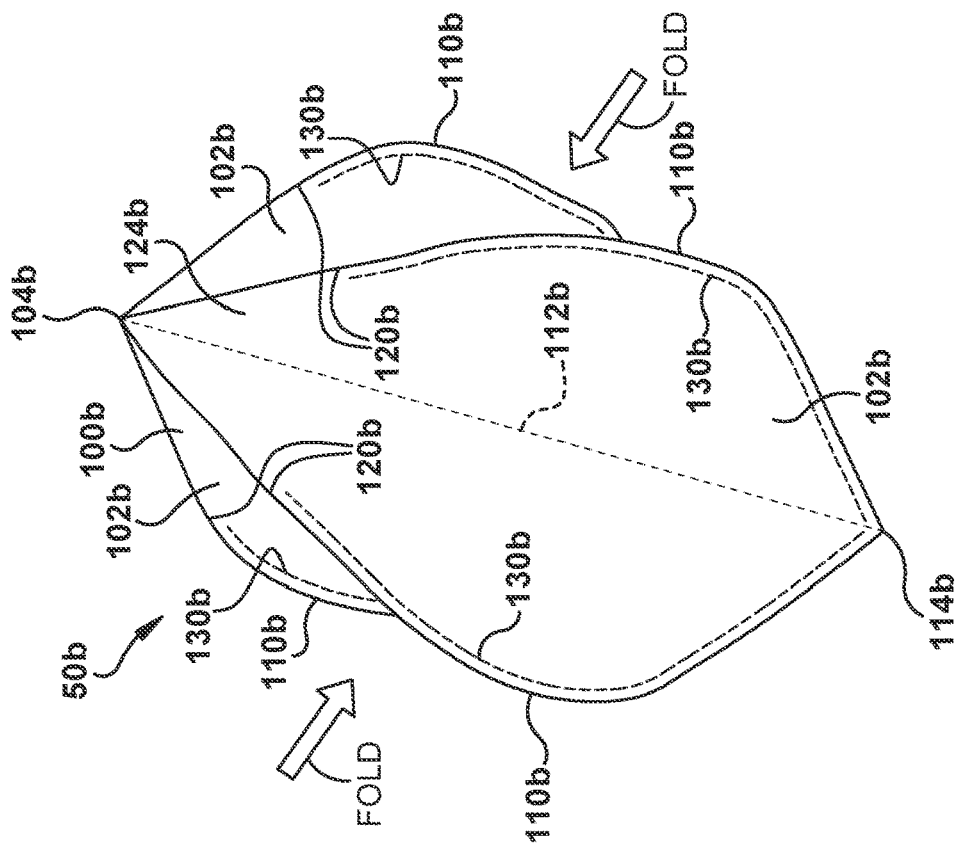
FIGS. 3A-3D illustrate a first example configuration of an airbag that can be implemented in the vehicle safety system of FIG. 1.
Figure 3A:
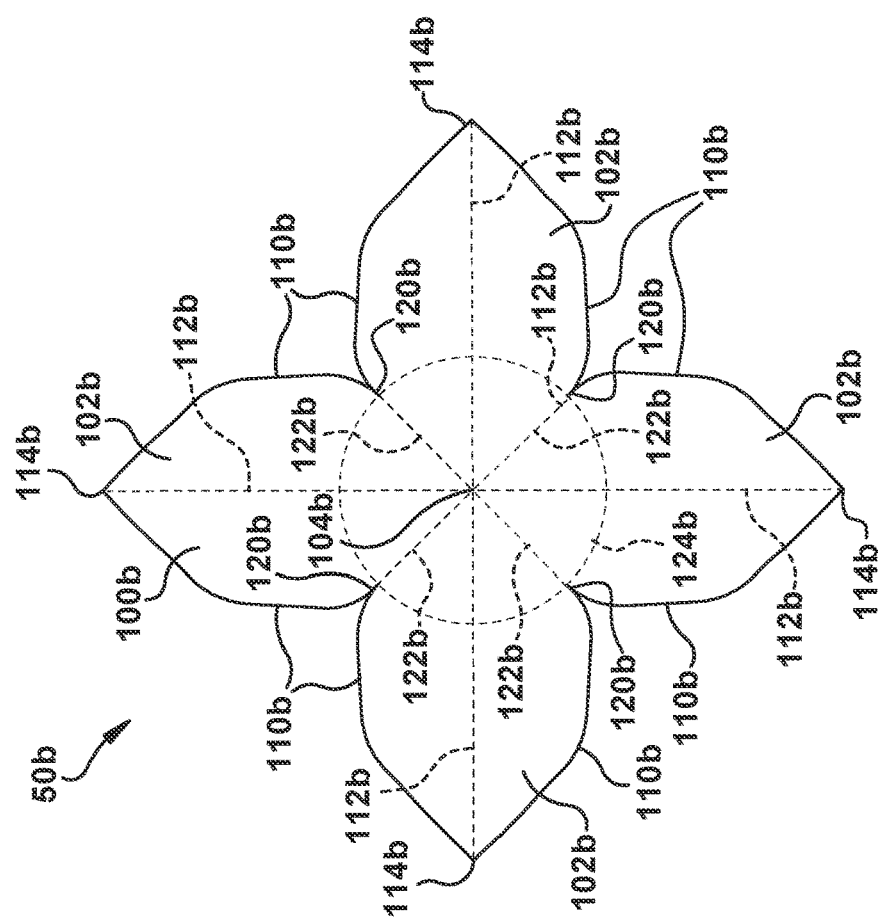

Referring to FIG. 3A, the airbag 50b includes a single panel 100b of airbag material (e.g., coated fabric) that is cut to a shape having four leaves 102b. As shown in the example configuration of FIGS. 3A-3D, the leaves 102b can have an identical configuration. The leaves 102b extend radially from a center point 104b on the panel 100b in orthogonal directions, with each leaf extending perpendicular to the adjacent leaves.

Each leaf 102b has opposite edges 110b that extend on opposite sides of a centerline 112b of the leaf. Like the leaves 102b, the centerlines 112b extend radially from the center point 104b of the panel 100b in orthogonal directions, with the centerline of each leaf extending perpendicular to the centerlines adjacent leaves. In the example configuration of FIG. 3A, the edges 110b are symmetrical with respect to the centerline 112b. The edges 110b do not, however, necessarily need to be symmetrical. It is, however, necessary for adjacent edges 110b to be equal or substantially equal in length, as will become apparent from the further descriptions set forth herein.

Each leaf 102b has a tip 114b located along its centerline 112b at the point furthest from the center point 104b of the panel 100b. The edges 110b of each leaf 102b meet at the tip 114b. Roots 120b of the leaves 102b are located at the ends of edges 110b opposite the tips 114b. The edges 110b of adjacent leaves 102b converge and meet each other at the roots 120b. Base lines 122b extend radially from the center point 104b to each root 120b. A base region 124b of the panel 100b is defined in the central area of the panel that extends radially outward from the center point 104b to the roots 120b. As shown in FIG. 3A, generally speaking, the base region 124b can be thought of as being bound by a circle with a center at the center point 104b having a radius equal to the lengths of the base lines 122b.

Referring to FIG. 3B, to construct the airbag 50b, the leaves 102b are manipulated, e.g., by bending or folding the panel 100b, so that adjacent edges 110b are positioned overlying each other. The overlying edges 110b are interconnected, e.g., by stitching, to form connections 130b that extend along the edges from the roots 120b to the tips 114b. The formation of the connections 130b joins the adjacent leaves 102b and closes the panel 100b, thus defining an inflatable volume of the airbag 50b. The airbag 50b is thus formed simply through cutting or otherwise forming the leaves 102b in the panel 100b and then interconnecting the leaves along their adjacent edges 110b. No other panels or assembly steps are necessary.

Advantageously, the configuration of the airbag 50b allows it to be folded flat for packaging in the airbag module. As shown in FIG. 3B, two opposing leaves 102b of the airbag 50b (left and right leaves as viewed in FIG. 3B) are folded inward along their respective centerlines 112b, as indicated by the FOLD arrows in FIG. 3B. At the same time, the remaining leaves 102b (front and rear leaves as viewed in FIG. 3B) are pressed flat, as shown in FIG. 6. The resulting folded-flat airbag 50b is shown in FIG. 3C.

The ability to fold-flat the airbag 50b is owed to the airbag configuration in which the leaves 102b extend from the center point 104b along centerlines 112b that extend through their respective tips 114b. Because of this, when the opposing pair of leaves 102b are folded inward along their respective centerlines 112b, the resulting halves of the folded-in leaves can lie flat on top of each other. At the same time, the folding of the opposing pair of leaves 102b allows the remaining pair of leaves, which also oppose each other, to lie flat, with the folded-in leaves positioned in between. Once the airbag is placed in the folded flat condition of FIG. 3C, it can be further rolled/folded in any manner necessary to package the airbag 50b for installation. Advantageously, due to the aforementioned design, placing the airbag 50b in the flat-folded condition requires only two inward folds, and avoids excessive pleating and other folds that are typically required with more complicated designs.

Figure 3D:
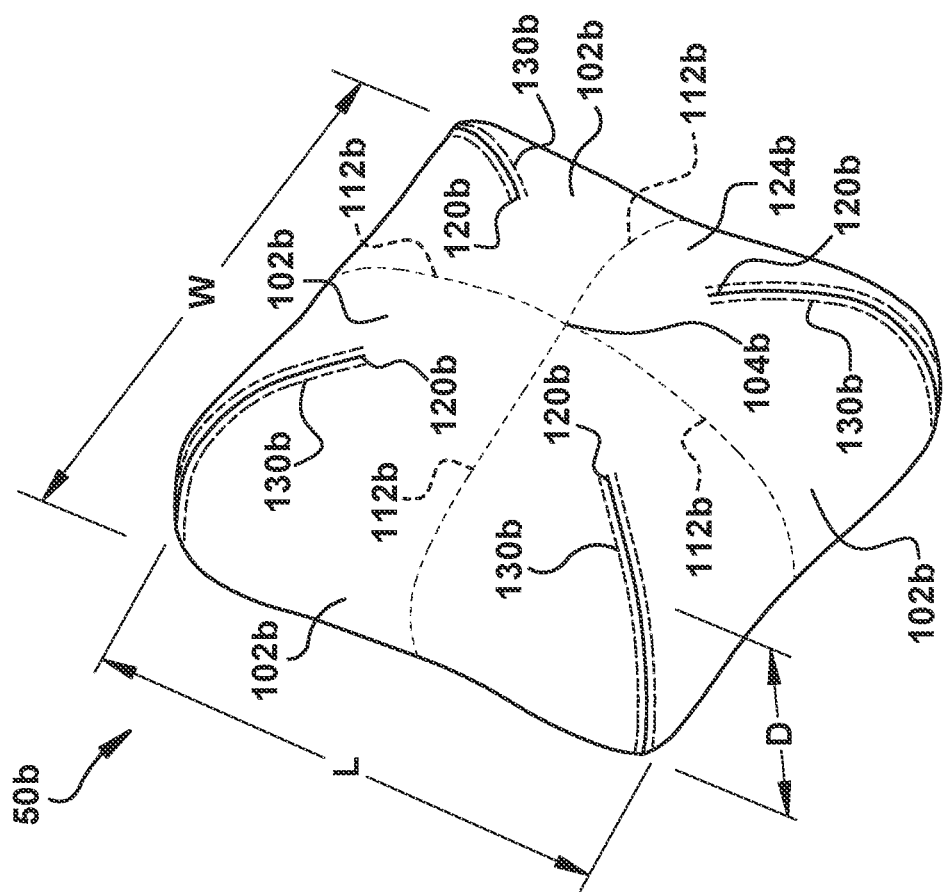
Figure 3C:
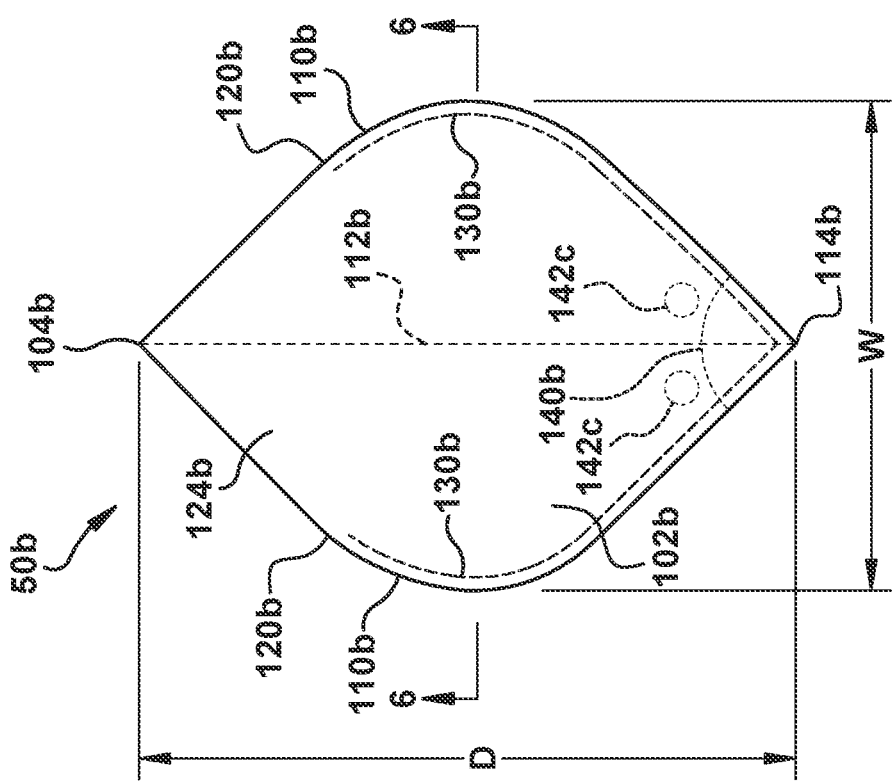

The airbag 50b is shown in its inflated state in FIG. 3D. As shown in this figure, the airbag 50b in expanding from the flat-folded condition, the airbag 50b contracts depthwise and expands lengthwise and widthwise, as indicated generally by the length L, width W, and depth D dimensions shown in FIGS. 3C-D. It will be appreciated that the resulting dimensions of the inflated airbag 50b are determined by the shape and dimensions of the panel 100b, specifically the leaves 102b. The inflated configuration of the airbag 50b can therefore be tailored by selecting/adjusting the dimensions of the leaves 102b, as will become evident from the additional example airbag configurations shown and described herein.

The airbag 50b of FIGS. 3A-D has a generally square configuration (see FIG. 3D) with the length L and width W dimensions being approximately equal and the depth D generally uniform or evenly distributes across its area. The airbag 50b, while generally square much like the airbag 50a of FIG. 2D, has a depth D that is significantly less than that airbag. This is owed to the configurations of the leaves 102b.

Comparing FIGS. 2A and 3A, the edges 110b of the leaves 102b are more rounded than the edges 110a. Additionally, the edges 110a include straight portions along their lengths, whereas the edges 110b are rounded throughout their lengths. As such, the lengths of the leaves 102a are longer than those of the leaves 102b, as measured from their respective center points 104a, 104b to their tips 114a, 114b. As these lengths of the leaves correspond to the depth dimension D (see FIGS. 2C and 3C) of the airbags 50a, 50b, it follows that the airbag of FIG. 3D has the shallower depth D. The shallow depth, comparatively thin airbag 50b of the second example configuration can, for example, be implemented as a steering wheel mounted driver airbag (see FIG. 1A). Other implementations could, however, be chosen.

In the assembled condition of the airbag 50b, the connections 130b meet each other at the location of the tips 114b of the leaves 102b. This end of the airbag 50b is therefore completely closed. Since the opposite end of the airbag 50b, i.e., the base 124b is also closed, it will be appreciated that the airbag represents a completely closed volume. Those skilled in the art will appreciate that the airbag 50b will necessarily be required to accommodate an inflator so that inflation fluid can be directed into the inflatable volume.

The portion of an airbag that interfaces with the inflator is referred to as an inlet or mouth portion of the airbag. The airbag 50b illustrated in FIGS. 3A-3D does not illustrate this feature, because its shape, size, and location can differ based on the implementation of the airbag and the portion(s) of the vehicle it is intended to cover. One example of a manner in which an inflator inlet can be implemented is shown in dashed lines in FIG. 3C.

Referring to FIG. 3C, the airbag 50b can include an inflator inlet 140b, which is illustrated in dashed lines in the figure. In this example configuration, the inlet 140b is formed at the end of the airbag 50b where the tips 114b of the leaves 102b meet. As shown, in FIG. 3C, the inlet 140b is formed as a circle, with each leaf 102b including a quarter-circle portion of the inlet. When the inlet 140b is implemented in this manner, the tips 114b of the leaves 102b where the connections 130b end are formed by the edges of the panel 100b that form the inlet. The inlet 140b could have alternative shapes, such as square, rectangular, or an irregular shape configured to accommodate the inflator. Still, the tips 114b of the leaves 102b would be formed by the edges of the panel 100b that form the inlet 140b. As shown in FIG. 3C, the airbag 50b can also include openings 142b for receiving fasteners, such as screws, bolts, pins, etc.

In the example configuration of FIGS. 3A-D, the inlet 140b is formed at the end opposite the base region 124b of the panel 100b. The base region 124b thus forms the occupant receiving surface of the airbag in the inflated condition (see FIG. 3D). Advantageously, the occupant receiving surface, formed by the base region 124b, is free from the stitching 130b that interconnects the leaves 102b. Thus, a large portion of the occupant receiving surface of the airbag 50b can be free from seams.

The inlet 140*b* and the openings 142*b* can be formed after the airbag 50*b* is stitched together by cutting the fabric along the lines shown in FIG. 3C. Alternatively, the inlet 140*b* and openings 142*b* can be cut in the panel 100*b* at the same time the remainder of the panel, including the leaves 102*b*, are formed. In this instance, the inlet 140*b* would become formed when the adjacent leaves 102*b* are stitched together.

The inlet 140*b* and openings 142*b* can be formed in other regions of the airbag 50*b*, either before or after the leaves 102*b* are stitched together. In this instance, the inlet 140*b* and/or openings 142*b* can be formed in a single leaf 102*b* or multiple leaves, depending on the desired location on the airbag 50*b*.

Third Example Configuration

A third example configuration of the airbag is shown in FIGS. 4A-4D. In FIGS. 4A-4D, reference numbers identical to those in FIGS. 2A-2D are used to identify portions or components of the third example configuration that are similar or identical to those of the first and/or second example configurations. In these figures, reference numbers with the suffix "c" is used in order to avoid confusion with other example configurations of the airbags disclosed herein.

Figure 4B:
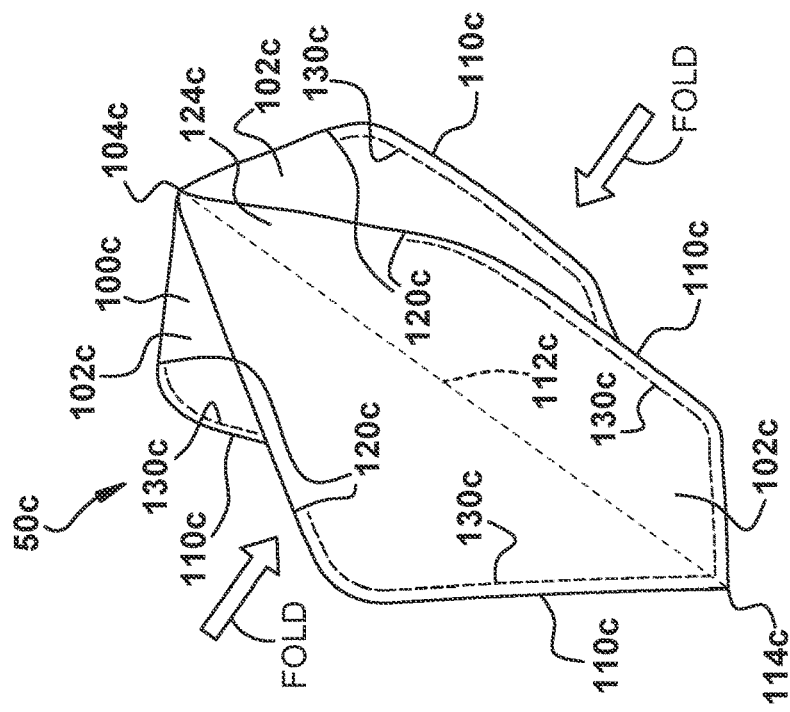
FIGS. 4A-4D illustrate a first example configuration of an airbag that can be implemented in the vehicle safety system of FIG. 1.
Figure 4A:
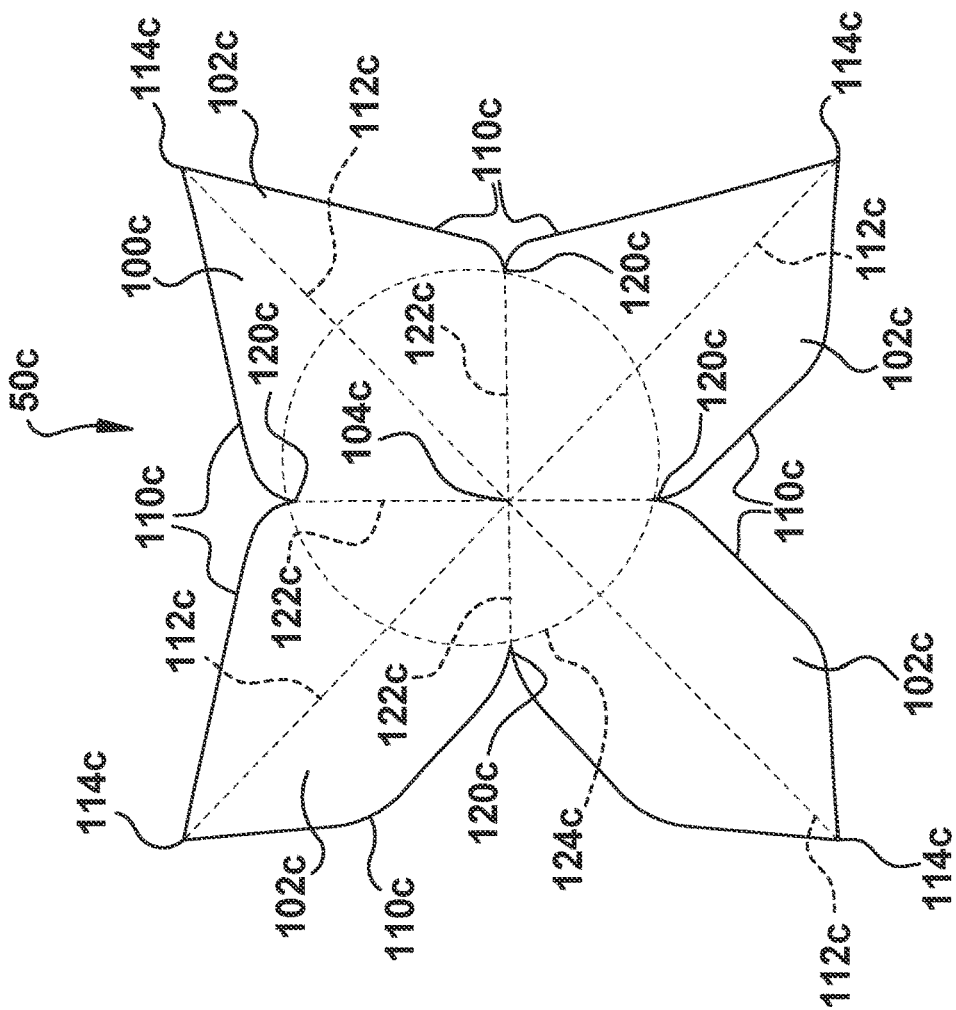

Referring to FIG. 4A, the airbag 50*c* includes a single panel 100*c* of airbag material (e.g., coated fabric) that is cut to a shape having four leaves 102*c*. As shown in the example configuration of FIGS. 4A-4D, the leaves 102*c* can have different configurations. The leaves 102*c* extend radially from a center point 104*c* on the panel 100*c* in orthogonal directions, with each leaf extending perpendicular to the adjacent leaves. In the example configuration of FIG. 4A, the upper-left and lower-right leaves 102*c* are identical; the upper-right and lower-left leaves 102*c* are not.

Each leaf 102*c* has opposite edges 110*c* that extend on opposite sides of a centerline 112*c* of the leaf. Like the leaves 102*c*, the centerlines 112*c* extend radially from the center point 104*c* of the panel 100*c* in orthogonal directions, with the centerline of each leaf extending perpendicular to the centerlines adjacent leaves. In the example configuration of FIG. 4A, the edges 110*c* of the upper-right leaf 102*c* are symmetrical with respect to the centerline 112*c*, as are those of the lower-left leaf. The edges 110*c* of the upper-left and lower-right leaves 102*c* are asymmetrical. Adjacent edges 110*c* of adjacent leaves 102*c* correspond in shape and are equal or substantially equal in length Each leaf 102*c* has a tip 114*c* located along its centerline 112*c* at the point furthest from the center point 104*c* of the panel 100*c*. The edges 110*c* of each leaf 102*c* meet at the tip 114*c*. Roots 120*c* of the leaves 102*c* are located at the ends of edges 110*c* opposite the tips 114*c*. The edges 110*c* of adjacent leaves 102*c* converge and meet each other at the roots 120*c*. Base lines 122*c* extend radially from the center point 104*c* to each root 120*c*. A base region 124*c* of the panel 100*c* is defined in the central area of the panel that extends radially outward from the center point 104*c* to the roots 120*c*. As shown in FIG. 4A, generally speaking, the base region 124*c* can be thought of as being bound by an area defined by arcs centers at the center point 104*c* having a radius equal to the lengths of the respective base lines 122*c* of the leaves 102*c*.

Referring to FIG. 4B, to construct the airbag 50*c*, the leaves 102*c* are manipulated, e.g., by bending or folding the panel 100*c*, so that adjacent edges 110*c* are positioned overlying each other. The overlying edges 110*c* are interconnected, e.g., by stitching, to form connections 130*c* that extend along the edges from the roots 120*c* to the tips 114*c*.

The formation of the connections 130*c* joins the adjacent leaves 102*c* and closes the panel 100*c*, thus defining an inflatable volume of the airbag 50*c*. The airbag 50*c* is thus formed simply through cutting or otherwise forming the leaves 102*c* in the panel 100*c* and then interconnecting the leaves along their adjacent edges 110*c*. No other panels or assembly steps are necessary.

Advantageously, the configuration of the airbag 50*c* allows it to be folded flat for packaging in the airbag module. This is true despite the asymmetrical shapes of the leaves 102*c* and edges 110*c*. As shown in FIG. 4B, two opposing leaves 102*c* of the airbag 50*c* (left and right leaves as viewed in FIG. 4B) are folded inward along their respective centerlines 112*c*, as indicated by the FOLD arrows in FIG. 4B. At the same time, the remaining leaves 102*c* (front and rear leaves as viewed in FIG. 4B) are pressed flat, as shown in FIG. 6. The resulting folded-flat airbag 50*c* is shown in FIG. 4C.

The ability to fold-flat the airbag 50*c* is owed to the airbag configuration in which the leaves 102*c* extend from the center point 104*c* along centerlines 112*c* that extend through their respective tips 114*c*. Because of this, when the opposing pair of leaves 102*c* are folded inward along their respective centerlines 112*c*, the resulting halves of the folded-in leaves can lie flat on top of each other. At the same time, the folding of the opposing pair of leaves 102*c* allows the remaining pair of leaves, which also oppose each other, to lie flat, with the folded-in leaves positioned in between. Once the airbag is placed in the folded flat condition of FIG. 4C, it can be further rolled/folded in any manner necessary to package the airbag 50*c* for installation. Advantageously, due to the aforementioned design, placing the airbag 50*c* in the flat-folded condition requires only two inward folds, and avoids excessive pleating and other folds that are typically required with more complicated designs.

Figure 4D:
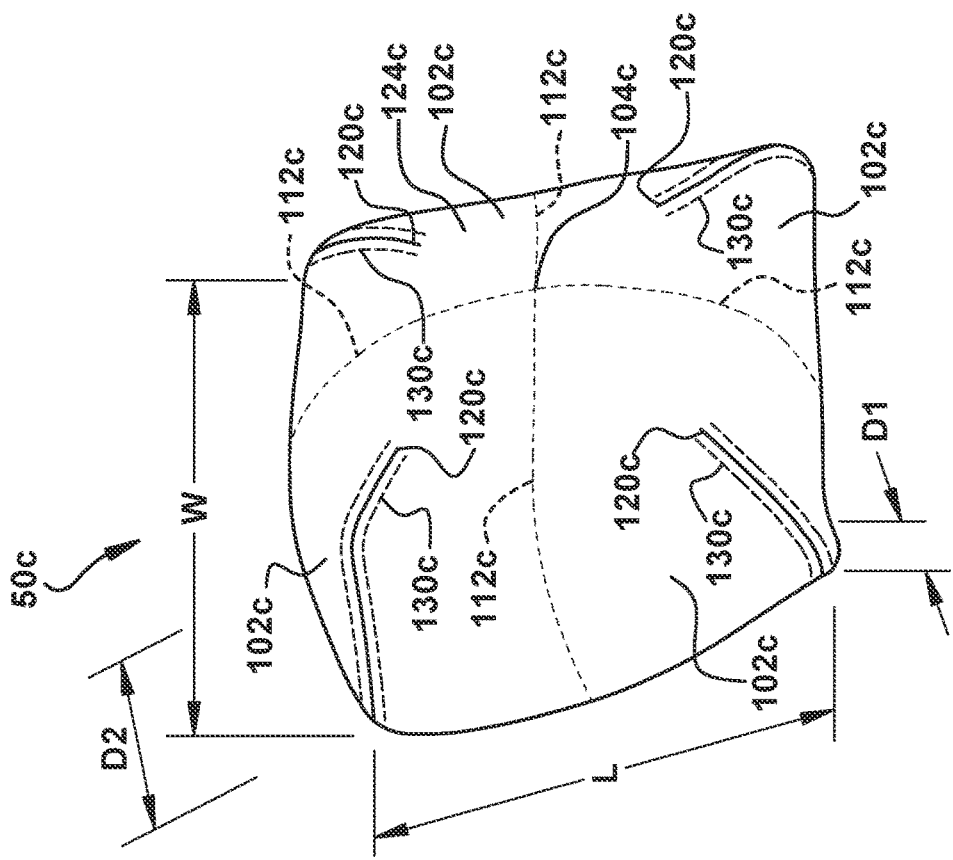
Figure 4C:
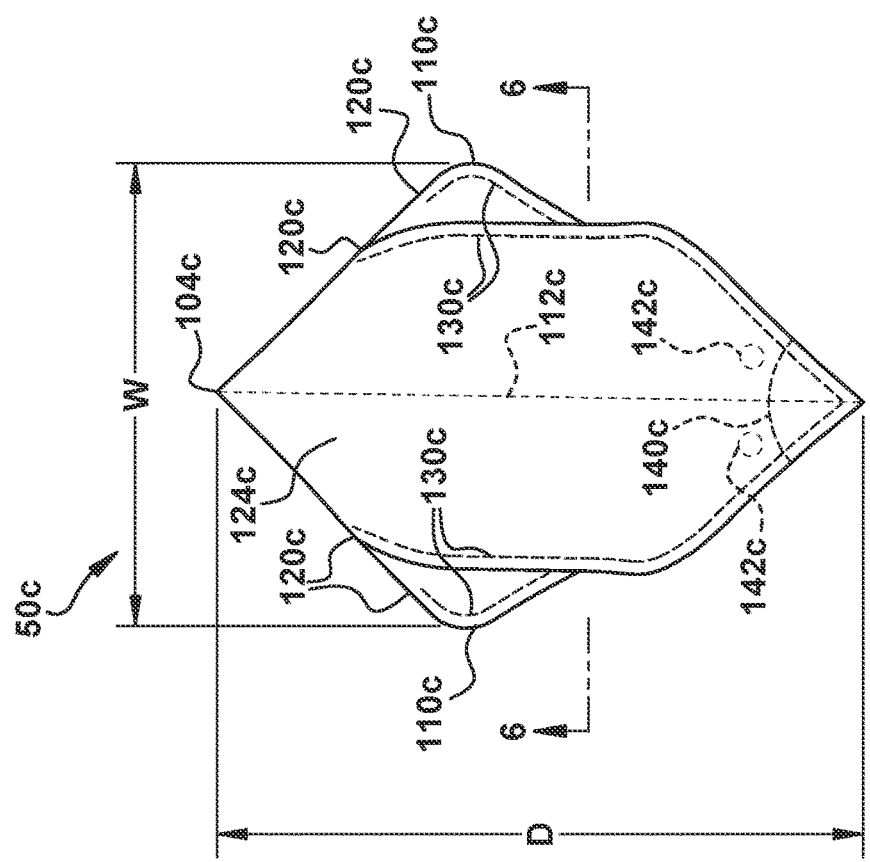

The airbag 50*c* is shown in its inflated state in FIG. 4D. As shown in this figure, the airbag 50*c* in expanding from the flat-folded condition, the airbag 50*c* contracts depth-wise and expands lengthwise and widthwise, as indicated generally by the length L, width W, and depth D dimensions shown in FIGS. 4C-D. It will be appreciated that the resulting dimensions of the inflated airbag 50*c* are determined by the shape and dimensions of the panel 100*c*, specifically the leaves 102*c*. The inflated configuration of the airbag 50*c* can therefore be tailored by selecting/adjusting the dimensions of the leaves 102*c*, as will become evident from the additional example airbag configurations shown and described herein.

The airbag 50*c* of FIGS. 4A-D has a generally square or rectangular configuration (see FIG. 4D) in the occupant facing length L and width W dimensions. Due, however, to the asymmetrical configurations of the leaves 102*c* and edges 110*c*, the depth D of the airbag 50*c* tapers from thick at the top to thin at the bottom as viewed in FIG. 4D. This tapered depth configuration is owed to the configurations of the leaves 102*c*.

The tapered depth configuration of the airbag 50*c* of the third example configuration can, for example, be implemented as a passenger airbag configured to be mounted to the instrument panel (see FIG. 1A).

In the assembled condition of the airbag 50*c*, the connections 130*c* meet each other at the location of the tips 114*c* of the leaves 102*c*. This end of the airbag 50*c* is therefore completely closed. Since the opposite end of the airbag 50*c*, i.e., the base 124*c* is also closed, it will be appreciated that the airbag represents a completely closed volume. Those skilled in the art will appreciate that the airbag 50*c* will necessarily be required to accommodate an inflator so that inflation fluid can be directed into the inflatable volume.

The portion of an airbag that interfaces with the inflator is referred to as an inlet or mouth portion of the airbag. The airbag 50c illustrated in FIGS. 4A-4D does not illustrate this feature, because its shape, size, and location can differ based on the implementation of the airbag and the portion(s) of the vehicle it is intended to cover. One example of a manner in which an inflator inlet can be implemented is shown in dashed lines in FIG. 4C.

Referring to FIG. 4C, the airbag 50c can include an inflator inlet 140c, which is illustrated in dashed lines in the figure. In this example configuration, the inlet 140c is formed in one of the leaves 102c and has a generally rectangular configuration. This shape and location for the inlet 140c can be selected for the passenger airbag configuration to facilitate its mounting in the instrument panel (see FIG. 1A). The inlet 140c could have alternative shapes, such as square, rectangular, or an irregular shape configured to accommodate the inflator. As shown in FIG. 4B, the airbag 50c can also include openings 142c for receiving fasteners, such as screws, bolts, pins, etc.

In the example configuration of FIGS. 4A-D, the inlet 140c is formed at the end opposite the base region 124c of the panel 100c. The base region 124c thus forms the occupant receiving surface of the airbag in the inflated condition (see FIG. 4D). Advantageously, the occupant receiving surface, formed by the base region 124c, is free from the stitching 130c that interconnects the leaves 102c. Thus, a large portion of the occupant receiving surface of the airbag 50c can be free from seams.

The inlet 140c and the openings 142c can be formed after the airbag 50c is stitched together by cutting the fabric along the lines shown in FIG. 4C. Alternatively, the inlet 140c and openings 142c can be cut in the panel 100c at the same time the remainder of the panel, including the leaves 102c, are formed. The inlet 140c and openings 142c can be formed in other regions of the airbag 50c, either before or after the leaves 102c are stitched together. In this instance, the inlet 140c and/or openings 142c can be formed in a single leaf 102c or multiple leaves, depending on the desired location on the airbag 50c.

Fourth Example Configuration

A fourth example configuration of the airbag is shown in FIGS. 5A-5D. In FIGS. 5A-5D, reference numbers identical to those in other example configurations (FIGS. 2A-2D, 3A-3D, 4A-4D) are used to identify portions or components of the second example configuration that are similar or identical to those of the first example configuration. In these figures, reference numbers with the suffix "d" is used in order to avoid confusion with other example configurations of the airbags disclosed herein.

Figure 5D:
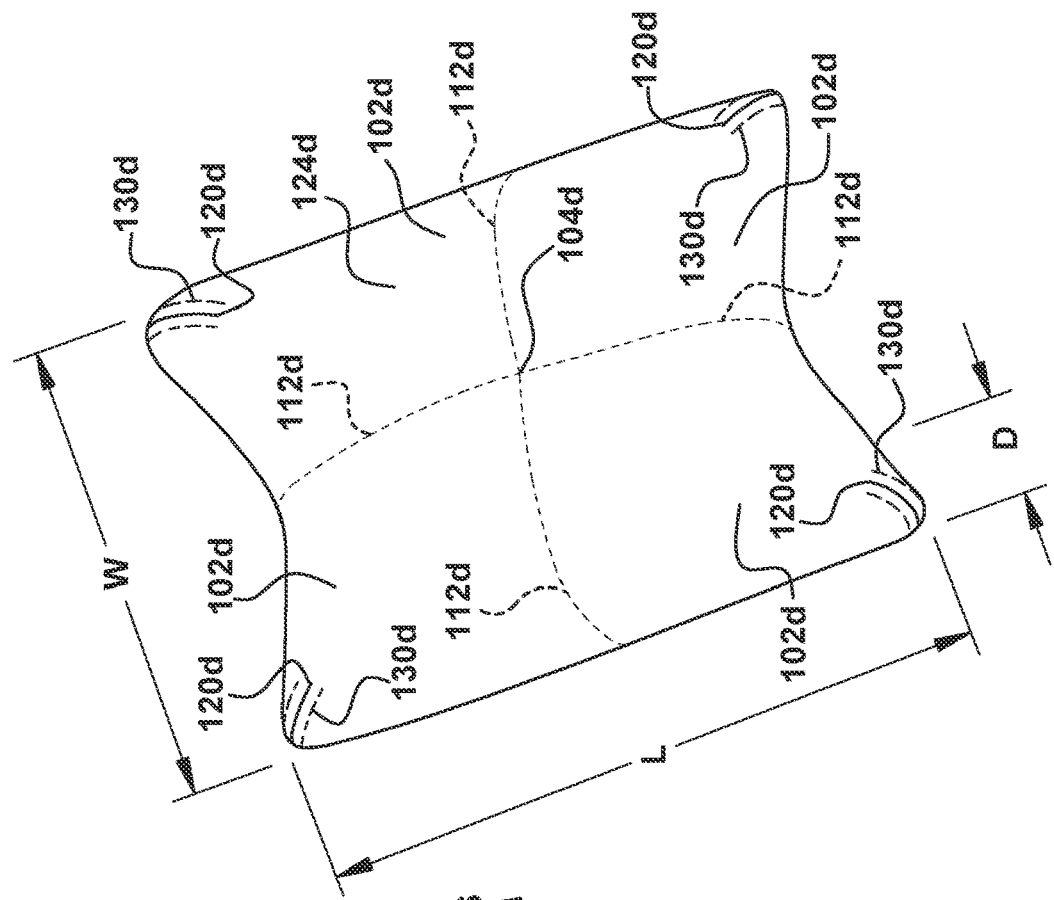

Referring to FIG. 5A, the airbag 50d includes a single panel 100d of airbag material (e.g., coated fabric) that is cut to a shape having four leaves 102d. As shown in the example configuration of FIGS. 5A-5D, the leaves 102d can have an identical configuration. The leaves 102d extend radially from a center point 104d on the panel 100d in orthogonal directions, with each leaf extending perpendicular to the adjacent leaves.

Each leaf 102d has opposite edges 110d that extend on opposite sides of a centerline 112d of the leaf. Like the leaves 102d, the centerlines 112d extend radially from the center point 104d of the panel 100d in orthogonal directions, with the centerline of each leaf extending perpendicular to the centerlines adjacent leaves. In the example configuration of FIG. 5A, the edges 110d are symmetrical with respect to the centerline 112d. The edges 110d do not, however, necessarily need to be symmetrical. It is, however, necessary for adjacent edges 110d to be equal or substantially equal in length, as will become apparent from the further descriptions set forth herein.

Each leaf 102d has a tip 114d located along its centerline 112d at the point furthest from the center point 104d of the panel 100d. The edges 110d of each leaf 102d meet at the tip 114d. Roots 120d of the leaves 102d are located at the ends of edges 110d opposite the tips 114d. The edges 110d of adjacent leaves 102d converge and meet each other at the roots 120d. Base lines 122d extend radially from the center point 104d to each root 120d. A base region 124d of the panel 100d is defined in the central area of the panel that extends radially outward from the center point 104d to the roots 120d. As shown in FIG. 5A, generally speaking, the base region 124d can be thought of as being bound by a circle with a center at the center point 104d having a radius equal to the lengths of the base lines 122d.

Referring to FIG. 5B, to construct the airbag 50d, the leaves 102d are manipulated, e.g., by bending or folding the panel 100d, so that adjacent edges 110d are positioned overlying each other. The overlying edges 110d are interconnected, e.g., by stitching, to form connections 130d that extend along the edges from the roots 120d to the tips 114d. The formation of the connections 130d joins the adjacent leaves 102d and closes the panel 100d, thus defining an inflatable volume of the airbag 50d. The airbag 50d is thus formed simply through cutting or otherwise forming the leaves 102d in the panel 100d and then interconnecting the leaves along their adjacent edges 110d. No other panels or assembly steps are necessary.

Figure 5C:
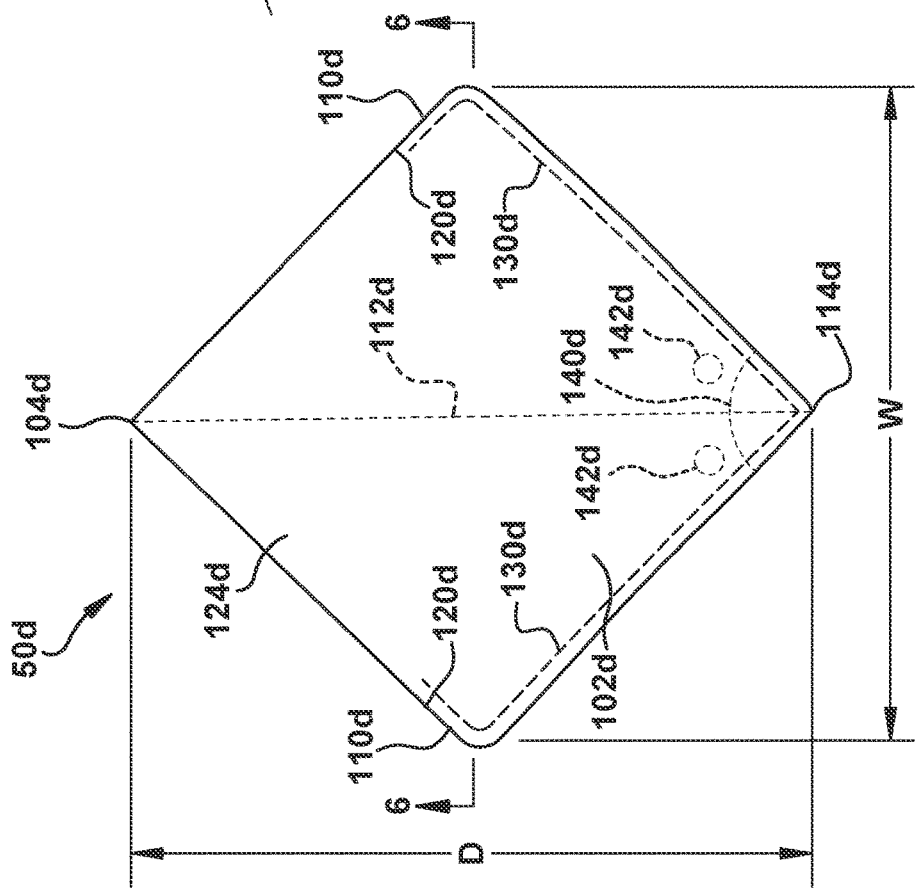

Advantageously, the configuration of the airbag 50d allows it to be folded flat for packaging in the airbag module. As shown in FIG. 5B, two opposing leaves 102d of the airbag 50d (left and right leaves as viewed in FIG. 5B) are folded inward along their respective centerlines 112d, as indicated by the FOLD arrows in FIG. 5B. At the same time, the remaining leaves 102d (front and rear leaves as viewed in FIG. 5B) are pressed flat, as shown in FIG. 6. The resulting folded-flat airbag 50d is shown in FIG. 5C.

The ability to fold-flat the airbag 50d is owed to the airbag configuration in which the leaves 102d extend from the center point 104d along centerlines 112d that extend through their respective tips 114d. Because of this, when the opposing pair of leaves 102d are folded inward along their respective centerlines 112d, the resulting halves of the folded-in leaves can lie flat on top of each other. At the same time, the folding of the opposing pair of leaves 102d allows the remaining pair of leaves, which also oppose each other, to lie flat, with the folded-in leaves positioned in between. Once the airbag is placed in the folded flat condition of FIG. 5C, it can be further rolled/folded in any manner necessary to package the airbag 50d for installation. Advantageously, due to the aforementioned design, placing the airbag 50d in the flat-folded condition requires only two inward folds, and avoids excessive pleating and other folds that are typically required with more complicated designs.

The airbag 50d is shown in its inflated state in FIG. 5D. As shown in this figure, the airbag 50d in expanding from the flat-folded condition, the airbag 50d contracts depthwise and expands lengthwise and widthwise, as indicated generally by the length L, width W, and depth D dimensions shown in FIGS. 5C-D. It will be appreciated that the resulting dimensions of the inflated airbag 50d are determined by the shape and dimensions of the panel 100*d*, specifically the leaves 102*d*. The inflated configuration of the airbag 50*d* can therefore be tailored by selecting/adjusting the dimensions of the leaves 102*d*, as will become evident from the additional example airbag configurations shown and described herein.

The airbag 50*d* of FIGS. 5A-D has a generally square configuration (see FIG. 5D) with the length L and width W dimensions being approximately equal and the depth D generally uniform or evenly distributes across its area. The airbag 50*d*, while generally square much like the airbag 50*b* of FIG. 3D, has a depth D that is significantly less than that airbag. This is owed to the configurations of the leaves 102*d*.

The panel 100*d* of FIG. 5D is square or rectangular in a general or overall sense. The edges 110*d* of the leaves 102*d* are straight and extend generally obliquely at right angles relative to each other, meeting at the tips 114*d*. The lengths of the leaves 102*d* measured from the center point 104*d* to the tips 114*d*, is short in comparison to other example configurations. This is because the distance between the roots 120*d* and the tips 114*d* is almost as short as possible. Any shorter, the roots 120*d* would extend to a lesser extent into the edge of the panel 100*d*. As the lengths of the leaves 102*d* correspond to the depth dimension D (see FIG. 5C) of the airbag 50*d*, it follows that the airbag of FIG. 5D has the illustrated shallow depth D. The shallow depth, comparatively thin airbag 50*d* of the fourth example configuration can be implemented in locations where space is limited and a thin airbag configuration is desired, such as a side airbag, center airbag, or knee airbag implementation.

In the assembled condition of the airbag 50*d*, the connections 130*d* meet each other at the location of the tips 114*d* of the leaves 102*d*. This end of the airbag 50*d* is therefore completely closed. Since the opposite end of the airbag 50*d*, i.e., the base 124*d* is also closed, it will be appreciated that the airbag represents a completely closed volume. Those skilled in the art will appreciate that the airbag 50*d* will necessarily be required to accommodate an inflator so that inflation fluid can be directed into the inflatable volume.

The portion of an airbag that interfaces with the inflator is referred to as an inlet or mouth portion of the airbag. The airbag 50*d* illustrated in FIGS. 5A-5D does not illustrate this feature, because its shape, size, and location can differ based on the implementation of the airbag and the portion(s) of the vehicle it is intended to cover. One example of a manner in which an inflator inlet can be implemented is shown in dashed lines in FIG. 5C.

Referring to FIG. 5C, the airbag 50*d* can include an inflator inlet 140*d*, which is illustrated in dashed lines in the figure. In this example configuration, the inlet 140*d* is formed at the end of the airbag 50*d* where the tips 114*d* of the leaves 102*d* meet. As shown, in FIG. 5C, the inlet 140*d* is formed as a circle, with each leaf 102*d* including a quarter-circle portion of the inlet. When the inlet 140*a* is implemented in this manner, the tips 114*a* of the leaves 102*a* where the connections 130*a* end are formed by the edges of the panel 100*a* that form the inlet. The inlet 140*d* could have alternative shapes, such as square, rectangular, or an irregular shape configured to accommodate the inflator. Still, the tips 114*d* of the leaves 102*d* would be formed by the edges of the panel 100*d* that form the inlet 140*d*. As shown in FIG. 5C, the airbag 50*d* can also include openings 142*d* for receiving fasteners, such as screws, bolts, pins, etc.

In the example configuration of FIGS. 5A-D, the inlet 140*d* is formed at the end opposite the base region 124*d* of the panel 100*d*. The base region 124*d* thus forms the occupant receiving surface of the airbag in the inflated condition (see FIG. 5D). Advantageously, the occupant receiving surface, formed by the base region 124*d*, is free from the stitching 130*d* that interconnects the leaves 102*d*. Thus, a large portion of the occupant receiving surface of the airbag 50*d* can be free from seams.

The inlet 140*d* and the openings 142*d* can be formed after the airbag 50*d* is stitched together by cutting the fabric along the lines shown in FIG. 5C. Alternatively, the inlet 140*d* and openings 142*d* can be cut in the panel 100*d* at the same time the remainder of the panel, including the leaves 102*d*, are formed. In this instance, the inlet 140*d* would become formed when the adjacent leaves 102*d* are stitched together.

The inlet 140*d* and openings 142*d* can be formed in other regions of the airbag 50*d*, either before or after the leaves 102*d* are stitched together. In this instance, the inlet 140*d* and/or openings 142*d* can be formed in a single leaf 102*d* or multiple leaves, depending on the desired location on the airbag 50*d*.

Controlling the Inflated Configuration of the Airbag

From the above descriptions, it will be appreciated that the inflated configuration of the airbag is determined by the configurations of the leaves. The shape of the leaves, i.e., the respective contours of the edges of the leaves, can be used to adjust inflated shape of the airbag. The lengths of the edges help control the inflated depth of the airbag. Longer edges produce an increased depth; shorter edges produce a decreased airbag depth. Differentials in the edges and their lengths can therefore be used to produce differentials in the inflated depth of the airbag in different regions as shown, for example, in the configuration of FIGS. 4A-4D.

Because the inflated shape/depth is controlled at least in part by the lengths and shapes of the edges, the characteristics of the leaves that define the lengths of the edges can be manipulated to control the inflated shape/depth of the airbag. For example, the locations of the roots with respect to the tips helps determine the lengths of the edges and, thus, inflated shape/depth of the airbag. The paths that the edges take from the tips to the roots, i.e., the shape or curvature of the edges, further affects the lengths of the edges and the inflated shape/depth of the airbag.

Additionally, while the example configurations show panels having four leaves extending orthogonally from the center point, neither the number of leaves nor the directions at which they extend are critical. For example, a panel with five, six, or more leaves could be implemented. In each case, the leaves would be configured so that adjacent edges of adjacent leaves are equal or close to equal in length so that the inflatable volume of the airbag is closed or substantially closed after the edges are connected.

Because of this, the configuration of the resulting airbag can be further tailored to the desired implementation. For example, increasing the number of leaves from four would tailor the shape of the front-facing surface of the airbag from the generally square/rectangular configuration shown in the example configurations to a shape more closely following the geometric shape having a number of sides corresponding to the number of leaves. Thus, for example, a six-leaf panel could produce an airbag with a generally hexagonal front-facing appearance. When inflated, this airbag might have a more rounded appearance.

From the above description of the example configurations, those skilled in the art will perceive additional improvements, changes, and modifications. These improvements, changes, and modifications within the skill of the art are intended to be covered by the appended claims.

Having described the invention, the following is claimed:

1. An apparatus for helping to protect an occupant of a vehicle, comprising:
   an airbag configured to be mounted on a vehicle structure and to be inflatable between the vehicle structure and the vehicle occupant, the airbag comprising a single sheet of airbag material configured to have a plurality of leaves that extend radially from a center point on the single sheet of airbag material, wherein each leaf comprises a tip and edges that extend on opposite sides of the tip from the tip to a root where adjacent leaves meet each other; and
   connections that interconnect adjacent edges of adjacent leaves on opposite sides of the root between the adjacent leaves, wherein the connections extend from the root to the tip to form a closed inflatable volume from the single sheet of airbag material, wherein the airbag is configured for an opposing pair of leaves to be folded inward along respective centerlines that extend from their tips to the center point on the single sheet of airbag material such that portions on opposite sides of the centerline of each leaf lie flat on top of each other.

2. The apparatus recited in claim 1, wherein the leaves extend orthogonally from the center point on the single sheet of airbag material.

3. The apparatus recited in claim 1, wherein each edge of each leaf has a length configured to control a depth of the airbag when inflated.

4. The apparatus recited in claim 1, wherein the airbag when deflated is configured to fold flat for storage prior to inflation.

5. The apparatus recited in claim 1, wherein a remaining pair of leaves are configured to lie flat against opposite sides of the folded inward opposing pair of leaves.

6. The apparatus recited in claim 1, wherein the leaves have edges that vary in length, wherein the lengths of the edges are configured to control an inflated depth of the airbag.

7. The apparatus recited in claim 6, wherein the adjacent edges of the adjacent leaves are configured so that their lengths are equal.

8. The apparatus recited in claim 1, wherein the connections comprise stitching that interconnect the adjacent edges.

9. The apparatus recited in claim 1, wherein the adjacent edges of adjacent leaves on opposite sides of the root between the adjacent leaves are equal in length.

10. The apparatus recited in claim 1, wherein the adjacent edges of adjacent leaves on opposite sides of the root between the adjacent leaves are identical.

11. The apparatus recited in claim 1, wherein the airbag comprises one of a steering wheel mounted driver airbag, an instrument panel mounted passenger airbag, a side airbag, a center airbag, or a knee airbag.

12. An airbag module comprising:
    the apparatus recited in claim 1,
    an inflator for inflating the airbag; and
    a housing for supporting the inflator and the airbag in a deflated and stored condition.

13. A vehicle safety system comprising:
    the airbag module recited in claim 12;
    at least one crash sensor; and
    a controller configured to control actuation of the inflator in response to the at least one crash sensor.

14. An apparatus for helping to protect an occupant of a vehicle, comprising:
    an airbag configured to be mounted on a vehicle structure and to be inflatable between the vehicle structure and the vehicle occupant, the airbag comprising a panel constructed of airbag material and configured to have a plurality of leaves that extend radially from a central region of the panel, wherein each leaf comprises a tip and opposite edges that extend from the tip to a root where adjacent leaves meet each other; and
    connections that interconnect adjacent edges of adjacent leaves on opposite sides of the root between the adjacent leaves, wherein the connections extend from the root to the tip to form a closed inflatable volume from the panel, wherein the airbag is configured for the leaves to be folded inward along respective centerlines of the leaves such that portions of the leaves on opposite sides of the centerlines lie flat on top of each other.

15. The apparatus recited in claim 14, wherein the edges of the leaves have respective lengths configured to control a depth of the airbag when inflated.

16. The apparatus recited in claim 14, wherein a first pair of opposing leaves are configured to be folded inward along their respective centerlines such that portions of the leaves on opposite sides of the centerlines lie flat on top of each, and a second pair of opposing leaves are configured to lie flat against opposite sides of the folded inward first pair of opposing leaves.

17. The apparatus recited in claim 14, wherein the leaves have edges that differ in length, and wherein adjacent edges of adjacent leaves are configured so that their lengths are equal.

18. The apparatus recited in claim 14, wherein the adjacent edges of adjacent leaves on opposite sides of the root between the adjacent leaves are equal in length.

19. The apparatus recited in claim 14, wherein the adjacent edges of adjacent leaves on opposite sides of the root between the adjacent leaves are identical.

20. The apparatus recited in claim 14, wherein the airbag comprises one of a steering wheel mounted driver airbag, an instrument panel mounted passenger airbag, a side airbag, a center airbag, or a knee airbag.

21. An airbag module comprising:
    the apparatus recited in claim 14,
    an inflator for inflating the airbag; and
    a housing for supporting the inflator and the airbag in a deflated and stored condition.

22. A vehicle safety system comprising:
    the airbag module recited in claim 21;
    at least one crash sensor; and
    a controller configured to control actuation of the inflator in response to the at least one crash sensor.

* * * * *